United States Patent [19]
Mandl

[11] Patent Number: 5,218,698
[45] Date of Patent: Jun. 8, 1993

[54] GARBAGE COLLECTION SYSTEM FOR A SYMBOLIC DIGITAL PROCESSOR

[75] Inventor: William J. Mandl, Canoga Park, Calif.

[73] Assignee: Aerojet-General Corporation, Rancho Cordova, Calif.

[21] Appl. No.: 796,306

[22] Filed: Nov. 22, 1991

[51] Int. Cl.[5] .................... G06F 12/00; G06F 12/08
[52] U.S. Cl. .................... 345/650; 364/DIG. 1; 364/281.1
[58] Field of Search .................... 364/281.1, DIG. 1; 395/650

[56] References Cited

U.S. PATENT DOCUMENTS

| | | | |
|---|---|---|---|
| 4,755,939 | 7/1988 | Watson | 364/300 |
| 4,797,810 | 1/1989 | McEntee et al. | 364/200 |
| 4,907,151 | 3/1990 | Bartlett | 364/200 |
| 5,088,036 | 2/1992 | Ellis et al. | 395/425 |

Primary Examiner—Gareth D. Shaw
Assistant Examiner—A. Katbab
Attorney, Agent, or Firm—Leonard Tachner

[57] ABSTRACT

A memory management process for garbage collection in a symbolic digital processor. An operating processor performs the symbolic digital processing while a memory management processor operates in the background to collect garbage, that is, to discard obsolete objects from memory. The memory management processor identifies all objects in old memory that are accessible from a root set of objects and copies the accessible objects to a copy space. In contrast to prior art systems, each accessible object in old space is not replaced by a pointer to copy space. Instead, a current copy of each of the accessible objects is created in copy space and upon completion of this task, the old space and copy space are exchanged or flipped almost instantaneously. As a consequence, the processing speed of the operating processor is unaffected by the garbage collection process thus allowing the operating processor to operate with real time processes.

4 Claims, 1 Drawing Sheet

GARBAGE COLLECTION SYSTEM FOR A SYMBOLIC DIGITAL PROCESSOR

BACKGROUND OF THE INVENTION

1. Field of the Invention

The present invention pertains to memory management systems for symbolic digital processors. More particularly, the invention pertains to systems for reclaiming for active use by the symbolic digital processor those portions of memory that are occupied by various forms of data and instructions that are obsolete and are no longer used by the symbolic digital processor. Because such systems are used to remove the data and instructions that are no longer needed they are often referred to as "garbage collectors".

2. Prior Art

Digital processors that implement symbolic languages such as LISP, PROLOG and SMALLTALK utilize the concept of an "object". The term "object" means an associated collection of information contained in memory which the digital processor treats as a single entity. The object may consist of one piece of data, i.e. a number, it may consist of many pieces of data in the form of a list, it may contain code, i.e. a sequence of processor instructions, and it may contain pointers to other objects. An object can contain combinations of all of these various items. In a typical application that is programmed in an object-oriented language, an object will contain both data and the functions or procedures that operate on such data. The important characteristic of the object is that the digital processor is able to recognize the object and to treat it as a single entity, which entity may include within it pointers to other objects in memory.

In simplest form, a pointer to an object is simply a memory location that contains the address of a location elsewhere in memory at which location the object pointed to is located. Because an object may contain within it pointer to other objects, a particular object may be but one of a series of objects in a sequence or chain of objects that originate from a set of base objects. The sequence of objects may even close upon itself in that a pointer located in an object in the sequence may point to an object that appears earlier in the sequence or "chain" of objects In the implementation of a symbolic language such as LISP, PROLOG, SMALLTALK, OBJECTIVE C or C++, the digital processor, referred to here as the "operating processor", creates numerous objects in memory The operating processor accesses the objects by means of the chains or sequences of pointers, all of which originate from within a collection of pointers and/or objects containing pointers, which collection is denoted the "root set". Languages such as SMALLTALK contain a standard library of objects from which all other objects are created. This standard library of objects is the "root set". In some other languages, such as C++, the programmer must first create a library of objects that together comprise the root set. For the purpose of this invention the important point is that, in operation, the root set of objects is fixed and unchanged, except that the pointers in the root set of objects may be altered so as to point to new objects created by the operating processor. Furthermore, all objects outside of the root set are accessible to the operating processor only by means of a chain or sequence of pointers that originate in the root set of objects. Because each object in such a "chain" of objects can, itself, point to more than one object, the objects that are accessible by the operating processor may be thought of as points on the limbs or branches of trees that represent the interconnecting pointers and that arise from the root set of objects.

In the computational process, the operating processor creates and alters (mutates) numerous objects in memory and creates, alters and destroys the pointers to these objects. Although during the computational process the operating processor may alter the location pointed to by a pointer contained in the root set, the operating processor does not otherwise alter the objects in the "root set". (Although the operating processor could be programmed to alter the objects in the root set, such a program would not arise in realistic application.) In the normal course of the computational process, many objects that have been created by the operating processor and which occupy space in memory are no longer needed. Such obsolete objects are referred to as "garbage" and the identification and removal of such objects is known as "garbage collection".

Various garbage collection schemes exist which utilize the fact that only those objects that can be accessed by the operating processor through a chain of pointers that originate in the root set need be retained in memory. Those objects that can no longer be accessed via such chains of pointers from the root set have become obsolete and are "garbage: and the memory that was occupied by these obsolete objects may be reclaimed for the storage of new objects.

One of the classical methods of garbage collection is called mark and sweep. With modifications, this algorithm is used in many modern LISP implementations. In this method the computational process, i.e. the processing or mutation of objects by the operating processor, is suspended periodically so that the operating processor, may be used to identify and remove from memory those objects that have become obsolete.

There are two phases to the algorithm: the mark phase and the sweep phase in the mark phase, beginning at the root set of objects, the pointers are followed along every "branch" of the tree. Every object that is encountered is marked by setting a "marking" bit in the object. All of the branches of the tree are searched to identify and mark all objects that can be accessed from the root set.

One method for systematically searching all of the branches is to follow a path from an object in the root set all of the way to the end of a branch or limb, recording the location (or address) of each point along the path at which the limb divides or branches. The search is then retraced to the most recently encountered point of branching, the limb just searched is marked as having been searched and all of the objects encountered in the return from the end of the limb to the point of branching are marked. Any unsearched limbs extending from the branching point are then searched to the end of each such limb and the location of any intervening points at which branching occurs are recorded. The process is repeated until all limbs (sequences of pointers) emanating from the objects in the root set have been searched.

After completion of the marking phase, the processor "sweeps" memory and removes all objects that have not been marked, i.e. the portions of memory that are occupied by objects that are no longer accessible from the root set are made available to the operating processor for the storage of newly created objects. In some implementations, in order to expedite the computational process, the accessible objects are then aggregated in one area of memory and the memory that has been reclaimed from occupation by obsolete objects is aggregated in another area. The pointers from the root set of objects are then altered so as to point to the new locations in memory to which the accessible objects have been moved.

A major disadvantage of the mark and sweep garbage collection algorithm is that the processing by the operating processor is suspended during the garbage collection. In a large scale system in which a substantial portion of the memory resides on disk or tape, garbage collection may interrupt processing for a period of hours. In many applications, such extended interruptions cannot be tolerated.

The lengthy interruptions for garbage collection may be avoided using a technique known as "copying garbage collection". Baker's algorithm is an example of this technique. See G. Baker, Jr., "List Processing in Real Time on a Serial Computer", Communications of the ACM, Vol. 21, No. 4, April, 1978. In a "copying" garbage collector, memory is divided into equal-sized areas called old space and new space. The operating processor is used in three different roles: first as a "mutator" to carry out the computation process required by the particular user application; second as a "transporter" to transport or copy objects in old space to new space; and third as a "scavenger" to search for objects located along the branches emanating from the root set of objects. In a simple implementation, the operation of the processor as a "mutator" is interrupted intermittently for short periods of time so that the processor may follow a set of instructions that cause it to function for a few moments either as a "scavenger" or as a "transporter".

When functioning as a "scavenger," the processor searches for objects on each of the branches emanating from the root set in the manner indicated above. Whenever the scavenger finds an object in old space that has not already been moved or copied into new space, the scavenger invokes the "transporter" software which copies the object from old space into new space and which leaves a pointer in old space at the location of the copied object that points to the location of the copied object in new space. The scavenger also then replaces the pointer that was used by the scavenger to arrive at the object in old space by a pointer that points to the location of the object in new space.

The operation of the mutator is restricted such that it places all newly created objects only in new space. Whenever the mutator either reads or modifies (mutates) an object that is located in old space (i.e. that has not been copied and replaced by a pointer to its location in new space) the mutator suspends its operation and invokes the transporter to move (i.e. to copy) the object in old space into new space and to replace the object in old space by a pointer to its new location in new space.

After the scavenging of old space is complete, the computations of the mutator are briefly suspended so that the allocation in memory of old space and new space can be interchanged or "flipped". During the "flip" the pointer in the root set that point to objects in old space are replaced by pointers that point to the locations of these objects in new space. The designations of new space and old space are then interchanged and the entire garbage collection process is begun again.

Improved copying garbage collection systems that sub-divide old space and new space into generations, so that the scavenging operations can be concentrated upon those generations of objects that are most likely to have become obsolete are described by Courts in U.S. Pat. No. 4,807,120 and by McEntee et al. in U.S. Pat. No. 4,797,810. Such garbage collection systems that take into account the temporal history of the objects are sometimes referred to as "ephemeral garbage collectors".

In "Garbage Collection in a Large Lisp System", Proc. 1984 ACM Symposium on Lisp and Functional Programming, August 1984, by D. Moon, the author describes a variation of the Baker Algorithm, in which variation the new space is sub-divided into copy space and new space. Objects from old space are copied into copy space and objects newly created by the mutator are placed only in new space. An operational "barrier" is erected between old space and the other spaces such that references to old space cannot spread to objects in new space. As a consequence only old space and copy space need to be searched by the scavenger for references to objects in old space.

Although the "copying garbage collection" schemes referred to above can avoid the interruption for extended periods of the operation of the processor as a mutator, the operation of the "mutator" is still interrupted whenever it encounters an object in old space that, since the last "flip", has not been copied to copy space. Since immediately following a "flip" nearly every existing object will be located in old space, the operation of the mutator, after a flip, will be repeatedly interrupted and slowed while the transporter is invoked to transport the object to copy space. The computational speed of the mutator is also slowed down as more objects are placed in copy space because each reference by the processor to an object that has been copied to copy space requires two accesses to memory, first to the pointer in old space that replaced the copied object and second to the object in copy space pointed to by the pointer in old space. Because the timing and rate at which such interruptions and delays may occur are unpredictable, a computational system that utilizes "copying" garbage collection will not be usable in a "real time" application if the computational speed of the mutator must be reliable and predictable.

Garbage collection systems that utilize a reference count that is maintained for each object are described by Watson in U.S. Pat. No. 4,755,939 ("939") and by Oxley et al. in U.S. Pat. No. 4,775,932 ("932"). When the count of reference pointers to an object becomes zero, the Watson ("939") and Oxley ("932") inventions assume that the object is no longer accessible from the root set and that the memory allocated to the object may be reclaimed. One problem with reference count systems, however, is that a group of objects may point to one another in a cyclical manner such that the reference count for each such object is not zero even though none of the objects in the group is pointed to by objects outside the group and though the objects are not accessible from the root set. Nevertheless, such a group of objects is obsolete and the memory occupied by such a group should be "collected" and reallocated for use by the processor. However, because none of the reference counts is zero, such groups are not detected by the reference count technique.

The Oxley invention ("932") recognizes the fact that the reference count technique will not remove all obsolete objects. For this reason the Oxley invention ("932") also uses a second garbage collection technique based upon the Baker algorithm to remove the obsolete objects that have not collected by the reference count technique. In addition to a central processing unit that acts as an operating processor, the Oxley invention ("932") also utilizes a second processor, a memory management processor, that operates in the background and that has the responsibility for garbage collection. In addition to removing objects for which the reference count has become zero, the memory management processor operates on individual sub-sections or sub-spaces of memory, one at a time, to identify objects that are not obsolete, to copy such current objects to a new sub-sections or sub-spaces in memory and to reclaim the sub sections of memory from which all currently accessible objects have been copied.

In the Oxley "932" invention, as each current object in an "old" sub-space is identified and copied to a "new" sub-space, a pointer is left in the old sub-space, which pointer points to the location in the new sub-space to which the object was copied, in a manner similar to that of the copying garbage collectors described above. Because the Oxley invention replaces the object that was copies from the old sub-space by a pointer to the location of the object in the new sub-space, the operating speed of the operating processor is affected by the garbage collection process. The operating speed is affected because whenever the operating processor accesses an object in the old sub-space that has been replaced by a pointer to the object's location in the new sub-space, the operating processor must perform a second access to memory to obtain access to the copied object. The Oxley invention also imposes the requirement that during the period of time in which an object is being copies from the old sub-space to the new sub-space, the operating processor must be denied access to this object. The need for a second access to memory for copied objects and the denial of access to objects that are in the process of being copied both degrade the predictability of the speed of the operating processor and reduce the attractiveness of this garbage collection technique for use in processors used in real time applications.

SUMMARY OF THE INVENTION

The present invention also utilizes a second processor in addition to the operating processor. However, the second processor, referred to herein as the memory management processor, operates in the background to perform the garbage collection process in a manner that does not interfere with, or slow down, the operation of the operating processor. This invention uses a modified version of the Baker algorithm in which old space is assigned to the operating processor and copy space is assigned to a memory management processor that operates concurrently with the operating processor without disturbing the latter processor's operation. Although the present invention copies objects in old space into copy space, it does not replace the objects in old space with pointers to copy space. As a consequence, because the operating processor in the present invention continues to access objects in old space, the speed of the operating processor is not slowed by a requirement for a second access to memory for objects that have been transferred to copy space.

The memory management processor also performs the copying of the objects in old space to copy space, without denying the operating processor from access to the object being copied. Because garbage collection by the present invention does not disturb the operation of the operating processor, it does not impair the predictability of the time required by the operating processor to perform the user applications. As a consequence, the present invention may be used for garbage collection in symbolic processors that are used for applications that operate in real time. The invention may also have application to heap management in processors utilizing languages such as ADA.

OBJECTS OF THE INVENTION

One object of this invention is to provide a memory system architecture and a memory management process which allows application programs to operate independently of the memory management requirements. Another object is to provide such an architecture and process wherein the management of memory does not alter or degrade the speed of operation of the operating processor and thus jeopardize or interfere with the use of the operating processor in real time applications. Another object of this invention is to provide a memory system architecture and memory management process that may be used with different operating processors and different software languages to perform the garbage collection process required in symbolic computational processes.

BRIEF DESCRIPTION OF THE DRAWING

The aforementioned objects and advantages of the present invention, as well as additional objects and advantages thereof will be more fully understood hereinafter as a result of a detailed description of a preferred embodiment when taken in conjunction with the following drawing in which.

DESCRIPTION OF A PREFERRED EMBODIMENT

Figure 1:
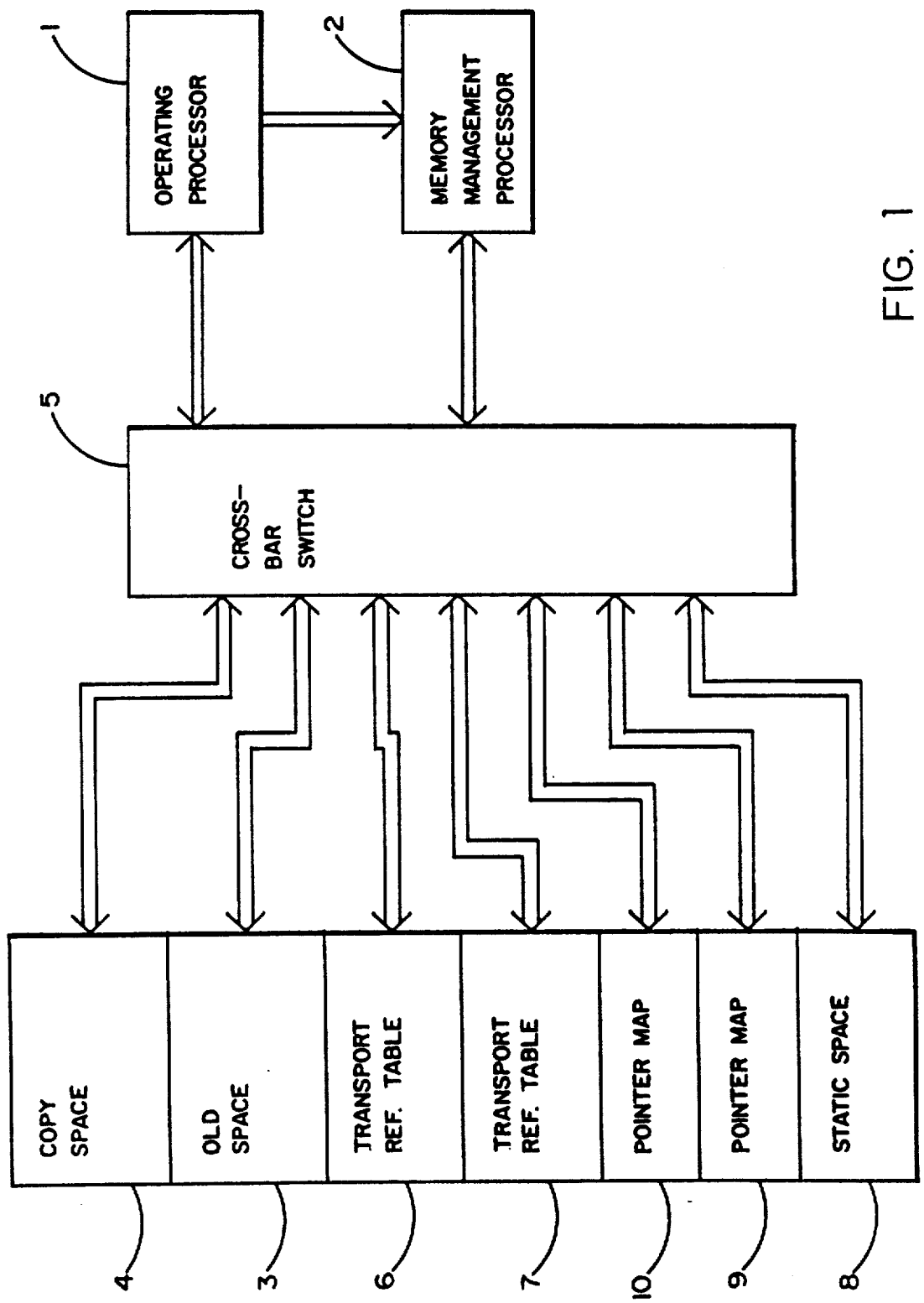
FIG. 1 is a block diagram of the invention.

Referring now to FIG. 1, as pointed out above, the present invention utilizes an operating processor 1 that acts as a mutator to perform the computations required by the application program. The invention utilizes a second processor, referred to as the memory management processor 2, that operates in the background to perform the garbage collection. A microprocessor that would be suitable for use as either the operating processor or the memory management processor is the MIPS R3000.

The present invention allocates and identifies portions of memory as old space 3 and copy space 4, each of which spaces can expand as needed to hold more objects (within the limits of available memory). By means of an electronic crossbar switch 5, old space is assigned to, i.e. made accessible to, the operating processor. The operating processor accesses objects in old space, mutates objects in old space and also writes new objects to a free area of memory that is considered to be part of old space. For the purposes of this disclosure and the claims of this invention, the designation "old space" includes both the portion of memory occupied by objects accessed by the operating processor and the portion of memory in which the operating processor writes new objects.

The copy space is assigned to, and made accessible by, the memory management processor. In order to locate and copy all objects in old space that are accessible from the root set, the memory management processor scans all branches emanating from the root set of objects in the manner described above with respect to the prior art. The root set of objects is contained in a portion of memory denoted static space 8. A portion of static space 8 that contains all pointers that point outside of static space is denoted pointer map 9. The memory management processor copies each of the accessible objects from old space into copy space but, in contrast to the garbage collection techniques described above, it does not replace the objects in old space with pointers to copy space. The present invention, instead, utilizes a computer memory architecture that includes a "transport tag bit" that is included in the representation of each of the words in memory that are used for the storage of an object. When the memory management processor copies an object from old space into copy space it "sets" one or more of the transport tag bits of the words in memory associated with the object in old space to indicate that the object has been copied to copy space. In the preferred embodiment only a single bit is set to signify that the object in old space has been copied to new space. However, in some applications it may be useful to set multiple bits in order to facilitate the recognition by the memory management processor that it is examining a word within a multiple word object that has, or has not, been copied from old space to copy space. The memory management processor need only access and examine transport tag bits for objects in old space As a consequence, the transport tag bits only need to exist for the objects in old space. However, for simplicity, in some implementations, the tag bits are arranged as an integral part of the memory occupied by the objects in both old space and copy space.

The memory management processor also sets up a cross-reference in transport reference table 6 or in transport reference table 7 that associates each of the objects that has been copied from old space into copy space with a pointer to the location of each such object in copy space. With respect to pointers from the root set to objects copied from old space, the memory management processor also enters into pointer map 10 an entry for each such pointer that points to the object's location in copy space. Following a flip, pointer map 10 is used by the operating processor as part of the root set instead of pointer map 9. Transport reference tables 6 and 7 similarly alternate in their use after successive flips. Although for simplicity of description and design, FIG. 1 depicts two transport reference tables (numbered 6 and 7) and two pointer maps (numbered 9 and 10), in most applications, only a single transport reference table and a single pointer map would be required since the memory allocated to a single transport reference table and a single pointer map, after a "flip", could be reused as the new transport reference table and the new pointer map. In applications where, after a flip, the operating processor may still contain outdated pointers in its internal registers, a second, previous generation, transport reference table would be used to translate the outdated pointers.

The transport reference table merely relates an object's address in old space to its new address in copy space. The transport table, itself, can be considered to be an accessible object by way of objects in old space whose only content is pointers to objects in copy space. Similarly, the pointer map may be considered to be an object that is accessible from the root set and whose only content is pointers to objects in copy space. Any of a number of well-known techniques may be used for the establishment of the transport reference table and the pointer map.

Each of the operating processor's write operations is also written to the memory management processor. The memory management processor then examines the memory location to which the object is being written by the operating processor to determine the nature of the object. If the object is being written to the new object area of old space, then the memory management processor ignores this object because the object will be identified by the memory management processor and copied to copy space in the course of its search for all objects accessible from the root set. If the operating processor is mutating an object in old space, the memory management processor interrupts its searching and copying operation to check the transport tag bit associated with the object in old space. The transport tag bit has not been "set", the object being written is ignored by the memory management processor because the object will be subsequently identified and copied in the course of the search for all accessible objects. However, if the transport tag bit has been set, the memory management processor writes a copy of the mutated object in copy space at the location pointed to by the transport reference table. The copy of the mutated object thus replaces the unmutated object that had previously been copied to copy space. The memory management processor then also searches the mutated object for all pointers. The pointers to objects in old space that have been copied to copy space are updated in accordance with the transport reference table so as to point to the objects' locations in copy space. For pointers in the mutated object which reference objects in old space that have not already been copied to copy space, the memory management processor then also searches along any branches in old space and copies to copy space any objects encountered in old space. The memory management processor then also updates the transport reference tables and the pointer map accordingly. As a consequence of these procedures the memory management processor maintains all objects current that previously have been copied to copy space and insures that all pointers that have been copied to copy space will point only to copy space.

The memory management processor continues to search old space for objects that are accessible from the root set and copies or transports these objects to copy space. As noted above the transport tag is always checked before an object is transported. This check insures that the object will not be copied a second time to copy space in the event that it had been identified in the search of another branch and previously copied to copy space. The mutation of an object in old space by the operating processor need not affect the operation of the memory management processor unless the object being mutated has previously been copied to copy space. As pointed out above, in this instance the mutated object must then be copied to copy space and any mutations to the pointers within the object must be searched for new branches and any objects in old space that are encountered in this search must be copied to copy space.

When the memory management processor has completed its search and all accessible objects have been copied to copy space, the copy space and old space are "flipped", i.e. the copy space is redesignated as old space and the old space is redesignated as copy space.

To effect a "flip", the memory containing old space and the "old" root set of pointers in pointer map 9 is switched by cross-bar switch 5 from operating processor 1 to the memory management processor 2 while, at the same moment, the memory containing the pointer map 10 and copy space 4 that contains the objects previously copied to copy space are switched to the operating processor. In this manner, the pointers in the root set which are contained in the pointer map 9 are replaced by the pointers in the pointer map 10 that were created by the memory management processor. On successive flips, pointer map 9 and pointer map 10 alternate as part of the root set.

Although in the preferred embodiment, in a "flip", all of copy space is interchanged with old space, it should be understood, that the important element of a "flip" is that at least that portion of copy space that is occupied by objects copied from old space is included as part of the newly designated old space and that the portion of memory that was designated as old space prior to the flip is now reclaimed for use by the processing system, which use includes use, in whole or in part, as the newly designated copy space. It should also be understood that the newly designated old space may include portions of memory in addition to that occupied by objects copied to the previously designated copy space.

After the "flip" the operating processor is only allowed to access objects within the boundaries of the newly designated "old space". If the particular system architecture is such that at the moment of a flip, some pointers to old space still reside in registers within the operating processor, then a subsequent attempt by the operating processor to access an address in memory that is now located outside of the newly established boundaries for the operating processor would be treated as if the address arose from a memory fault. In response to the apparent memory fault, the memory management processor would replace the apparently incorrect address in the pointer by the correct address that is contained in either the transport reference table or the pointer map. In tnis event the operation of the operating processor would be suspended momentarily, but such a momentary suspension would occur only in architectures in which an operating processor register might retain an outdated address. In any case, the delay occasioned by the suspension would normally be negligible.

The entire process of "flipping" memory can be achieved in one switch cycle if the electronic crossbar switch 5 is used to implement the logical connections between memory and the operating processor and between memory and the memory management processor. The crossbar switch type L64270 manufactured by LSI Logic Corporation is an example of a switching device that may be used for this purpose. However, other means for switching the logical interconnections could be used for this purpose.

The garbage collection process described above thus removes all obsolete objects from memory without slowing the operation of the operating processor.

I claim:

1. A digital processing device having a root set of objects containing pointers to objects comprising:

a memory for storage of objects and having an area designated as old space and an area designated as copy space;

operating processor means for creating new objects in old space and for mutating old objects in old space;

memory management processor means for identifying all objects in old space that are accessible from the root set of objects and for copying to copy space each such accessible object and for generating a transport reference table containing a pointer for each such accessible object in old space to the object's location in copy space and for generating a pointer map containing pointers from the root set to objects in copy space, said pointers in the pointer map corresponding to the pointers in the root set to the objects in old space that have been copied to copy space, the pointers in the pointer map pointing to such copied objects' locations in copy space;

the memory management processor means further including updating means for identifying any object in old space that is mutated by the operating processor means and that has been previously copied to copy space and for copying the mutated object to copy space;

flipping means for redesignating at least that portion of copy space occupied by copied objects as old space and releasing old space for use as newly designated copy space and upon such redesignation also replacing the pointers in the root set with the corresponding pointers in the pointer map to the objects in the newly designated old space;

prior to each flip, the operating processor means continuing to create, access and mutate objects in old space.

2. The device described in claim 1 and having a transport tag associated with each object stored in old space, said transport tag indicating whether or not the associated object in old space has been copied to copy space.

3. A process for management of memory in a symbolic digital processor having an operating processor, a memory management processor, and a memory including a root set of objects that include pointers to other objects, comprising:

designating a portion of memory as old space and making the old space accessible to the operating processor for mutating objects in old space and for writing new objects into old space;

designating a portion of memory as copy space and making the copy space accessible to the memory management processor for copying objects form old space into copy space;

beginning with the root set of objects, the memory management processor searching for all objects in old space that are accessible from the root set of objects;

the memory management processor copying each accessible object in old space into copy space, tagging each object in old space with a transport tag to indicate that it has been copied to copy space, for each object so copied updating a transport reference table to point from the location of the copied object in old space to its location in copy space, and for each object copied from old space that is pointed to by a pointer in the root set updating a map of pointers for such objects;

writing also to the memory management processor each object written to old space by the operating processor, the memory management processor examining the transport tag associated with said object in old space to determine if the object has been copied to copy space and if said object has been copied to copy space, interrupting the search by the memory management processor for accessible objects, copying said object to the location in copy space pointed to by the transport reference table, searching the mutated or newly written object for pointers to objects in old space and updating these pointers as needed in accord with the transport reference table and searching the mutated object for pointers to all objects in old space that are accessible from the mutated object and which have not already been placed in copy space and copying into copy space any such objects;

after all objects in old space that are accessible from the root set have been copied to copy space, performing a flip, the flip replacing old space with copy space and replacing the pointers in the root set to objects in old space with an updated set in the pointer map of pointers to the locations of objects in the area of memory which after the flip becomes old space.

4. A symbolic digital processor system comprising:
   a memory;
   an operating processor creating new objects and mutating old objects in memory in the performance of the symbolic digital processing;
   a memory management processor identifying and removing obsolete objects from the memory;
   the memory being conceptually divided into a plurality of regions including two regions that are accessible by the operating processor and designated as:
     i) old space, and
     ii) static space having a root set of objects and including a set of pointers to objects in old space,
   and four regions that are accessible by the memory management processor and designated as:
     iii) old space,
     iv) copy space,
     v) a transport reference table, and
     vi) a pointer map;
   the objects that are accessible to the operating processor being accessible via a sequence of pointers emanating from the root set of objects;
   each of the objects in old space having a transport tag associated therewith;
   the operating processor reading from and writing to old space;
   beginning from the root set of objects in static space, the memory management processor scanning the sequences of pointers to identify all objects that are accessible by the operating processor from the root set of objects, and for each such accessible object the memory management processor setting the transport tag associated with such object, copying such object to copy space and entering a cross-reference to each such object in the transport reference table and also entering a pointer in the pointer map if the object is pointed to by a pointer in the root set of objects;
   all write operations by the operating processor to old space being written also to the memory management processor;
   for each object written by the operating processor to old space, the memory management processor checking the transport tag associated with such object in old space to determine if such object has previously been copied by the memory management processor to copy space, and if so, the memory management processor then copying the currently written object to copy space;
   the scanning of the pointers emanating from the root set by the memory management processor being interrupted whenever the operating processor mutates an object in old space that has already been copied by the memory management processor into copy space, in each such instance the memory management processor then copying into copy space the object mutated by the operating processor and redirecting any new pointers contained therein in accord with the transport reference table, all pointers to old space being redirected to copy space for all objects that have been copied to copy space and for each pointer to an object in old space that has not been copied to copy space, copying each such object to copy space and redirecting the pointer to the object's location in copy space;
   means for flipping the old space and copy space following completion of the scanning by the memory management processor of pointers emanating from the root set, so that the current copy space that was available only to the memory management processor subsequently becomes old space that is accessible to the operating processor and what currently was old space, upon flipping, becomes the new copy space that is accessible to the memory management processor;
   the means for flipping also including means for replacing the pointers in static space to objects in old space prior to the flip with a new set of pointers in static space that point to the objects' locations in old space following the flip.

* * * * *